United States Patent [19]

Farrar

[11] 4,348,767

[45] Sep. 7, 1982

[54] WEDGE SHAPED ELECTRODE BLOCK

[75] Inventor: Gordon A. Farrar, Newark, Ohio

[73] Assignee: Owens-Corning Fiberglas Corporation, Toledo, Ohio

[21] Appl. No.: 220,322

[22] Filed: Dec. 29, 1980

[51] Int. Cl.³ .......................................... C03B 5/027
[52] U.S. Cl. ........................................ 373/30; 373/36
[58] Field of Search ................. 13/6, 35; 65/DIG. 4, 65/DIG. 6, 355, 356

[56] References Cited

U.S. PATENT DOCUMENTS 3,683,093  8/1972  Gell et al. .................................. 13/6

FOREIGN PATENT DOCUMENTS 14420 of 1906 United Kingdom ..................... 13/6

Primary Examiner—Roy N. Envall, Jr.
Attorney, Agent, or Firm—Ronald C. Hudgens; Patrick P. Pacella; Ronald E. Champion

[57] ABSTRACT

An electrode block for use in the bottom wall of an electric glass-melting furnace comprising a body of refractory material having an aperture therein which is suitably sized to mate with an electrode, the body having a top and bottom and at least one side that is slanted such that the area of the bottom is greater than the area of the top.

5 Claims, 2 Drawing Figures

WEDGE SHAPED ELECTRODE BLOCK

BACKGROUND OF THE INVENTION

This invention relates to glass production and, more particularly, to an electrode block for use with an electric furnace. It is intended that the term "electric furnace," as used herein, denotes both electric melt and electric boost furnaces.

Electric glass melting furnaces have a plurality of submerged electrodes that are positioned in the furnace in a predetermined pattern. An electric current is caused to flow through the molten glass between the electrodes to heat the glass by the Joule effect. The electrodes are inserted through electrode blocks in the bottom wall of the furnace; generally, such electrode blocks are rectangularly shaped and are made of fused cast refractory, such as alumina and zirconia. A significant problem that has occurred in the operation of such furnaces is the difficulty encountered when the electrodes are raised or inserted into the furnace. Quite often a great deal of upward force has to be exerted by the electrode jack in order to move the electrode through the aperture in the electrode block. This increased force causes the block to loosen and hence tend to slip out of place, thereby making it difficult to insert more electrode into the furnace. In addition, if the block is moved out of position, more of the top surface of the block is exposed to the glass, thereby accelerating wear of the block.

Therefore, it is an object of the present invention to provide an electrode block for use in the floor of an electric glass melting furnace that does not tend to loosen or move when an upward force is exerted on the electrode.

SUMMARY OF THE INVENTION

In accordance with the present invention, there is provided an electrode block for use in the bottom wall of an electric glass-melting furnace comprising a body of refractory material having an aperture therein which is suitably sized to mate with an electrode, the body having a top and bottom and at least one side that is slanted such that the area of the bottom is greater than the area of the top.

In addition, the invention provides an electric furnace for melting thermoplastic material. The furnace comprises a chamber having a bottom wall and sidewalls, such chamber being adapted for holding the thermoplastic material. First, second and third blocks are positioned in the bottom wall of the chamber. Each of the first and second blocks has an aperture that is adapted to mate with an electrode. The first block has a first side that is perpendicular to its top. The second block has a first side that is perpendicular to its top and a slanted second side that is opposite to the first side. The first side of the second block is positioned adjacent to the first side of the first block, and the second side is slanted such that the top of the second block has an area that is smaller than the area of the bottom of the second block. The third block has a first side that is slanted such that the area of the top of the third block is larger than the area of the bottom of the third block. The first side of the third block, which is slanted at substantially the same angle as the second block, is positioned adjacent the second side of the second block. Electrodes are inserted into the chamber through the apertures of the first and second blocks.

The slanted or tapered side of the electrode block of the present invention causes the block to wedge against an ajacent block, thereby allowing the furnace operator to exert more pressure on the electrode without the danger of the block slipping up into the furnace, as is the case with the straight sided blocks taught by the prior art. Only one side of the block has to be tapered; however, if desired, other sides may also be tapered. The electrode block of the present invention is outstandingly adapted for use with the furnace disclosed in U.S. Pat. No. 3,634,588; however, it may be used with any electric furnace. The electrode block of the present invention would replace the smaller electrode blocks in the aforesaid patent and would hence wedge against the larger electrode block of the electrode island.

Other objectives, advantages and applications of the present invention will be made apparent by the following detailed description of the preferred embodiments of the invention.

DETAILED DESCRIPTION OF THE PREFERRED EMBODIMENTS

Figure 1:
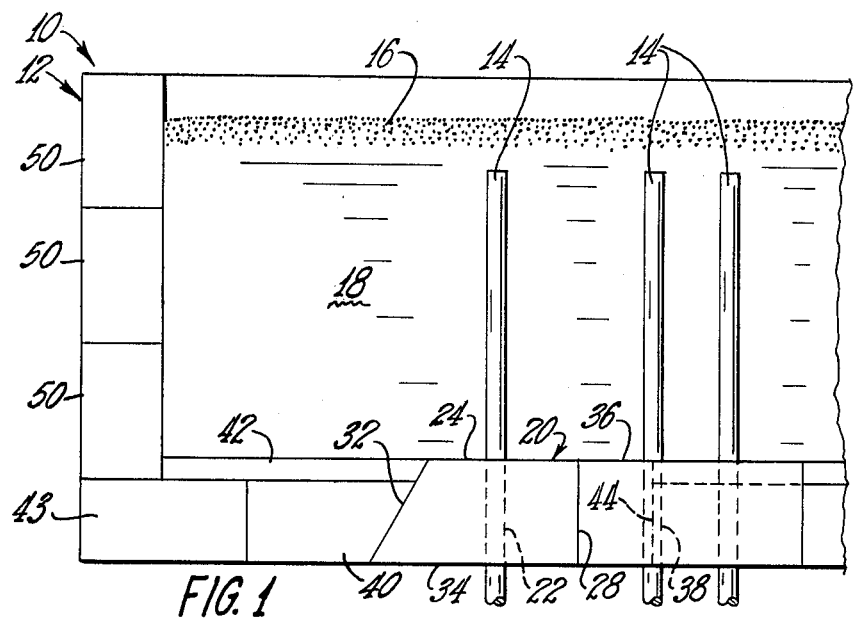
FIG. 1 is a partial diagrammatic view in longitudinal cross section of an electrically operated, glass-melting furnace utilizing the present invention.

Referring to FIG. 1, a glass-melting furnace utilizing the present invention is indicated generally by numeral 10. Furnace 10 has a melting tank 12 with a plurality of electrodes 14 extending upwardly through the bottom wall thereof. Electrodes 14 are suitably positioned throughout tank 12 in a desired pattern, as is well known in the electrical furnace art, for example, the configuration disclosed in U.S. Pat. No. 3,634,588. Electrodes 14 are supplied with power from a controlled source of power (not shown) which causes a current to flow between electrodes 14, thereby melting the batch material 16 to form a pool of molten glass 18. Molten glass 18 flows into a forehearth region (not shown) to glass fiber production means, as is known in the art.

Figure 2:
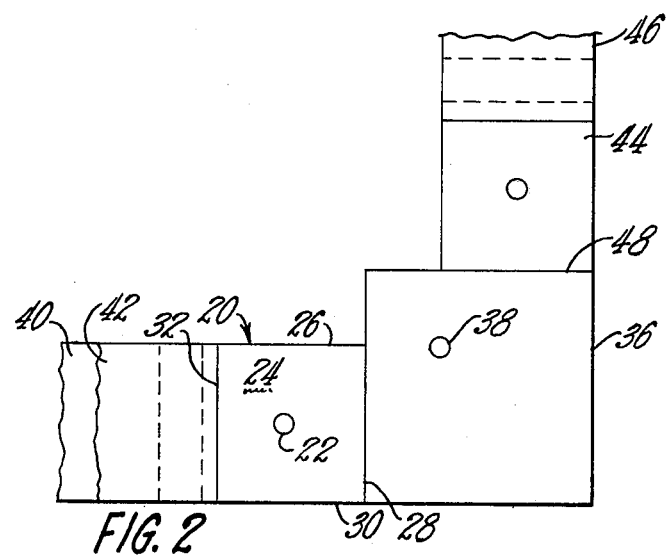
FIG. 2 is a diagrammatic plan view of the electrode block configuration of the present invention.

Referring to FIGS. 1 and 2, an electrode block 20 having an aperture 22 located therein that is suitably sized to mate with electrode 14 is positioned in the bottom wall of melting tank 12. Block 20 has a top 24 that is rectangularly shaped with aperture 22 being located in the center thereof. Sides 26, 28 and 30 are perpendicular to top 24. Side 32 is slanted such that bottom 34 has an area that is larger than the area of top 24. Side 28 of electrode block 20 is placed adjacent a side of electrode block 36 which is rectangularly shaped and larger in size than electrode block 20. Electrode block 36 has an aperture 38 which mates with an electrode 14. Electrode blocks 20 and 36 are made of refractory material such as fused cast alumina and zirconia. A flux block 40 and glass contact block 42, which is also made of refractory material, have slanted sides that mate with side 32 of electrode block 20. Similarly, an electrode block 44 along with glass contact block 46 are located adjacent side 48 of electrode block 36. The construction and orientation of electrode block 44 along with glass contact block 46 are the same as that of electrode block 20 and glass contact block 42 and, therefore, will not be discussed in detail. The remainder of the bottom wall and sidewalls of tank 12 consists of flux block 43, glass contact blocks 50, as well as the necessary structural supports and insulating blocks as is known in the art.

An upward force exerted on electrode 14 which is inserted through aperture 22 of electrode block 20 would cause electrode block 20 to wedge its side 28 against electrode block 36, thereby allowing a furnace operator to exert a greater amount of force on electrode 14 without causing electrode block 20 to slip into melting tank 12. Accordingly, the present invention facilitates insertion of electrodes 14 into melting tank 12, thereby insuring efficient operation of the furnace, personnel safety and reduced chance of damage to the structure of furnace 10. As described herein, electrode blocks 20 and 44 have been shown to have only one side that is slanted; however, more than one side may be slanted. If the subject electrode block is used separately rather than in conjunction with a large center electrode block 36 each of its sides may be slanted, if desired.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

I claim:

1. An electric furnace for melting thermoplastic material, said furnace comprising: a chamber having a bottom wall and sidewall and being adapted for holding said thermoplastic material; a first block having an aperture adapted for mating with an electrode and having a top and a first side that is perpendicular to said top, said first block being located in said bottom wall of said chamber; a second block having an aperture adapted for mating with an electrode and having a top, bottom, a first side that is perpendicular to said top of said second block and located adjacent to said first side of said first block and a second side opposite said first side of said second block, said second side being slanted such that said top of said second block has an area that is smaller than the area of said bottom of said second block; a third block having a top, bottom, and a first side that is slanted such that the area of said top of said third block is larger than the area of said bottom of said third block, said first side of said third block being slanted at substantially the same angle as said second side of said second block and said first side of said third block being positioned adjacent said second side of said second block.

2. An electric furnace is recited in claim 1, wherein said first block is larger than said second block.

3. An electric furnace as recited in claim 2, wherein said first and second blocks are made of a composition comprising alumina and zirconia.

4. A plurality of refractory blocks arranged in the bottom wall of an electric glass melting furnace wherein: at least one of the refractory blocks has an aperture therein which is suitably sized to mate with an electrode and support the electrode in the molten glass; the exterior of each of the electrode supporting refractory blocks is constructed so that at least one of the sides is not parallel with either its adjacent or opposite side and the top of the block has less area than the bottom of the block; the electrode supporting block being adjacent to a nonelectrode supporting refractory block which is constructed such that it has a side which is configured to be coextensive with the side of the adjacent electrode supporting refractory block such that the blocks tend not to loosen or move when an upward force is exerted on the electrode.

5. A refractory block as recited in claim 4 wherein the refractory is a composition of zirconia and alumina.

* * * * *